United States Patent
Nishide et al.

(10) Patent No.: US 12,338,123 B2
(45) Date of Patent: Jun. 24, 2025

(54) HYDROGEN PEROXIDE PRODUCTION METHOD

(71) Applicant: INTERNATIONAL FRONTIER TECHNOLOGY LABORATORY, INC., Tokyo (JP)

(72) Inventors: Hiroyuki Nishide, Tokyo (JP); Kouki Oka, Tokyo (JP); Bjorn Winther-Jensen, Tokyo (JP)

(73) Assignee: International Frontier Technology Laboratory, Inc., Tokyo (JP)

( * ) Notice: Subject to any disclaimer, the term of this patent is extended or adjusted under 35 U.S.C. 154(b) by 578 days.

(21) Appl. No.: 17/762,877

(22) PCT Filed: Jul. 22, 2020

(86) PCT No.: PCT/JP2020/028394
§ 371 (c)(1),
(2) Date: Mar. 23, 2022

(87) PCT Pub. No.: WO2021/059716
PCT Pub. Date: Apr. 1, 2021

(65) Prior Publication Data
US 2022/0363538 A1 Nov. 17, 2022

(30) Foreign Application Priority Data
Sep. 26, 2019 (JP) ................. 2019-175028

(51) Int. Cl.
| | |
|---|---|
| C01B 15/027 | (2006.01) |
| B01J 23/34 | (2006.01) |
| B01J 23/46 | (2006.01) |
| B01J 23/75 | (2006.01) |
| B01J 31/06 | (2006.01) |
| B01J 35/00 | (2024.01) |
| B01J 35/39 | (2024.01) |

(52) U.S. Cl.
CPC ............. *C01B 15/027* (2013.01); *B01J 23/34* (2013.01); *B01J 23/462* (2013.01); *B01J 23/75* (2013.01); *B01J 31/06* (2013.01); *B01J 35/39* (2024.01)

(58) Field of Classification Search
CPC ......... C01B 15/027; B01J 35/39; B01J 23/34; B01J 23/462; B01J 23/75; B01J 31/06
See application file for complete search history.

(56) References Cited

U.S. PATENT DOCUMENTS

2014/0141346 A1 5/2014 Fukuzumi

FOREIGN PATENT DOCUMENTS

| CN | 110885984 A | * | 3/2020 | ............... C25B 1/30 |
|---|---|---|---|---|
| JP | 2018-089589 A | | 6/2018 | |
| JP | 2019-039048 A | | 3/2019 | |
| JP | 2019-130523 A | | 8/2019 | |
| KR | 1563346 B1 | | 10/2015 | |
| WO | 2013/002188 A1 | | 1/2013 | |

OTHER PUBLICATIONS

Najafpour et al., Chem. Review, (2016), v.116, p. 2286-2936.*
Mitraka et al., Advanced Sustainable Systems, (2019), V.3, 1800110 (1-6), Supporting Information.*
Kentaro Mase et al., Nature Communications, p. 1-7, (May 4, 2016) (provided by Applicant in IDS).*
International Search Report for corresponding Application No. PCT/JP2020/028394, mailed Sep. 24, 2020.
Written Opinion for corresponding Application No. PCT/JP2020/028394, mailed Sep. 24, 2020.
Campos-Martin, J. M., et al., "Hydrogen Peroxide Synthesis: An Outlook beyond the Anthraquinone Process", Angew. Chem. Int. Ed. 45, 6962-6982 (2006) (English Abst).
Global Industry Analysts, Inc., "Hydrogen peroxide", A Global strategic business report, MCP-2080, https://www.strategyr.com/pressMCP-2080.asp (to be provided).
Fukuzumi, S., et al., "Hydrogen peroxide as a sustainable energy carrier: Electrocatalytic production of hydrogen peroxide and the fuelcell", Electrochim, Acta 82, 493-511 (2012) (English Abst).
Jin, Z., et al., "Constructing hydrogen bond based melam/WOheterojunction with enhanced visible-light photocatalytic activity", Appl. Catal. B 205, 569-575 (2017) (English Abst).
Shiraishi, Y., et al., "Sunlight-Driven Hydrogen Peroxide Production from Water and Molecular Oxygen by Metal-Free Photocatalysts", Angew. Chem. Int. Ed. 53, 13454-13459 (2014) (English Abst).
Wei, Z., et al., "Efficient visible-light-driven selective oxygen reduction to hydrogen peroxide by oxygenenriched graphitic carbon nitride polymers," Energy Environ. Sci. 11, 2581-2589 (2018) (English Abst).
C. H. Ng, O. Winther-Jensen, et al., Exploration and optimisation of poly(2,20-bithiophene) as a stable photo-electrocatalyst for hydrogen production, J. Mater. Chem. A, 2015, 3, 11358.
Oka, K., et al., "Light-assisted electrochemical water-splitting at very low bias voltage using metal-free polythiophene as photocathode at high pH in a full-cell setup," Energy Environ. Sci. 11, 1335-1342 (2018) (English Abst).
Oka, K., et al., "Poly(1,4-di(2-thienyl)benzene Facilitating Complete Light-Driven Water Splittingunder Visible Light at High pH," Adv. Energy Mater. 9, 1803286, (2019) (English Abst).

(Continued)

*Primary Examiner* — Yong L Chu
(74) *Attorney, Agent, or Firm* — Renner, Otto, Boisselle & Sklar, LLP (57) ABSTRACT

Irradiating a film of a thiophene polymer that is a pure organic compound with light allows the thiophene polymer film to act as a light absorber and catalyst that produces hydrogen peroxide from water and water-dissolved air (oxygen) at extremely high efficiency, and this film can work in alkaline water in which a film of a general-purpose inexpensive water-oxidizing catalyst, which is used as a counter electrode, is active. Provided is an environmentally compatible and simple method for producing hydrogen peroxide at extremely high efficiency, including combining a film of a catalyst for light absorption and oxygen reduction that consists of a thiophene polymer with a catalyst for water oxidation, immersing the combination in alkaline water, and irradiating the light-absorbing oxygen reduction catalyst film with light.

11 Claims, 1 Drawing Sheet

(56) References Cited

OTHER PUBLICATIONS

Fan, Wenjun et al., Efficient hydrogen peroxide synthesis by metal-free polyterthiophene via photoelectrocatalytic dioxygen reduction, Energy Environ., Sci., Nov. 26, 2019, 2020, 13, 238-245., DOI: 10.1039/c9ee02247c.

Campos-Martin, J. M., et al., "Hydrogen Peroxide Synthesis: An Outlook beyond the Anthraquinone Process", Angew. Chem. Int. Ed. 45, 6962-6982 (2006) (English Abst) (now submitting entire document in English).

Fukuzumi, S., et al., "Hydrogen peroxide as a sustainable energy carrier: Electrocatalytic production of hydrogen peroxide and the fuelcell", Electrochim, Acta 82, 493-511 (2012) (now submitting entire document in English).

Jin, Z., et al., "Constructing hydrogen bond based melam/WO3 heterojunction with enhanced visible-light photocatalytic activity", Appl. Catal. B 205, 569-575 (2017) (now submitting entire document in English).

Shiraishi, Y., et al., "Sunlight-Driven Hydrogen Peroxide Production from Water and Molecular Oxygen by Metal-Free Photocatalysts", Angew. Chem. Int. Ed. 53, 13454-13459 (2014) (now submitting entire document in English).

Wei, Z., et al., "Efficient visible-light-driven selective oxygen reduction to hydrogen peroxide by oxygenenriched graphitic carbon nitride polymers," Energy Environ. Sci. 11, 2581-2589 (2018) (now submitting entire document in English).

C. H. Ng, O. Winther-Jensen, et al., Exploration and optimisation of poly(2,2'-bithiophene) as a stable photo-electrocatalyst for hydrogen production, J. Mater. Chem. A, 2015, 3, 11358 (resubmitting entire document in English).

Oka, K., et al., "Light-assisted electrochemical water-splitting at very low bias voltage using metal-free bolythiophene as photocathode at high pH in a full-cell setup," Energy Environ. Sci. 11, 1335-1342 (2018) (now submitting entire document in English).

Oka, K., et al., "Poly(1,4-di(2-thienyl))benzene Facilitating Complete Light-Driven Water Splitting under Visible Light at High pH," Adv. Energy Mater. 9, 1803286, (2019) (now submitting entire document in English).

Fan, Wenjun et al., Efficient hydrogen peroxide synthesis by metal-free polyterthiophene via photoelectrocatalytic dioxygen reduction, Energy Environ., Sci., Nov. 26, 2019, 2020, 13, 238-245., DOI: 10.1039/c9ee02247c (now submitting entire document in English).

Mase, Kentaro et al. "Seawater usable for production and consumption of hydrogen peroxide as a solar fuel", Nature Communications, 17:11470, DOI: 10.1038/ncomms11470, www.nature.com/naturecommunications, May 4, 2016, pp. 1-7.

Mitraka, Evangelia et al. "Electrocatalytic Production of Hydrogen Peroxide with Poly(3,4-ethylenedioxythiophene) Electrodes", Adv. Sustainable Syst. 2019, 3, 1800110, pp. 1-6.

Zouaoui et al. "Electro-synthesis, characterization and photoconducting performance of ITO/polybithiophene-$MnO_2$ composite", Materials Science and Engineering B 208 (2016), pp. 29-38.

Extended European Search Report dated Oct. 10, 2023 corresponding to European Application No. 20867358.2.

\* cited by examiner

HYDROGEN PEROXIDE PRODUCTION METHOD

TECHNICAL FIELD

The present invention relates to a method for producing hydrogen peroxide, and the like. More specifically, the present invention relates to a method for producing hydrogen peroxide, and the like, under light irradiation, using combination formed by a film of a catalyst for light absorption and oxygen reduction (hereinafter referred to as a light-absorbing oxygen reduction catalyst film) and a catalyst for water oxidation (hereinafter referred to as a water-oxidizing catalyst); electric conductive combination structure connecting an electric conductive plate having the surface coated with a thiophene polymer film that acts as a light-absorbing oxygen reduction catalyst film and an electric conductive plate having the surface coated with a film of a water-oxidizing catalyst (hereinafter referred to as a water-oxidizing catalyst film) via a conductor; an electric conductive plate sandwiched between a light-absorbing oxygen reduction catalyst film and a water-oxidizing catalyst film; a microparticle that is coated with a light-absorbing oxygen reduction catalyst film and has catalytic activity for water oxidation; and the combination structure, the plate, or the microparticle.

BACKGROUND ART

Hydrogen peroxide has been widely used in industry, for example as a bleaching agent in the paper and pulp industry, as an effluent treatment in the environmental industry, and as an oxidizing agent in the chemical industry (Non-Patent Document 1). Hydrogen peroxide has been increasingly used worldwide year by year (estimated to reach 6 Mt/year in 2024, Non-Patent Document 2) and is a critically important compound in industry. Recently, hydrogen peroxide has been investigated and tested for its potential as a clean energy source and a fuel for fuel cells, comparable with hydrogen (Non-Patent Document 3), and is partly in practical use. For example, an aqueous solution of 3% hydrogen peroxide is used for all purposes, such as daily necessities including antiseptics and an oxidizing agent for organic synthesis.

Methods for producing hydrogen peroxide include direct synthesis by reacting hydrogen with oxygen under pressure and electroreduction of oxygen. Industrially, autooxidation with anthraquinone is mainly used at present. However, such methods are not necessarily advantageous at present and in future because they involve steps of extracting an organic solvent used in reactions, such as benzene, and hydrogen peroxide generated and require high pressure hydrogen and catalysts therefor, and hydrogen is sourced from fossil resources (Non-Patent Document 1).

Some studies reported several simple, environmentally compatible, and ideal methods for producing hydrogen peroxide by irradiating a catalyst with light to reduce water-dissolved oxygen. In these studies, hydrogen peroxide was produced under light irradiation using melam, tungsten (IV) oxide, and graphite carbon nitride as catalysts for light absorption and oxygen reduction (Non-Patent Documents 4, 5, and 6). However, these studies were performed under irradiation of ultraviolet light at 400 nm or shorter with pure oxygen blown, and a majority of the catalysts that are keys to this technique are environmentally incompatible. In addition, these studies resulted in extremely low production rates of hydrogen peroxide (10 µg hydrogen peroxide/mg catalyst/hour). Thus, these methods are now far from producing hydrogen peroxide from water under an atmosphere of air under light irradiation.

On the other hand, the present inventors have conducted many studies on photoelectrochemical water splitting and hydrogen generation for a long time (Non-Patent Document 7). The present inventors have recently reported that hydrogen gas evolves when a film of a highly pure thiophene polymer prepared by their own iodine vapor-assisted polymerization method was immersed in water and irradiated with light at an applied voltage of about 0.5 V (or without an applied voltage, although resulting in a low reaction rate) to achieve water splitting (Non-Patent Documents 8 and 9).

CITATION LIST

Non-Patent Documents

Non-Patent Document 1: Campos-Martin, J. M., et al., Angew. Chem. Int. Ed. 45, 6962-6984 (2006)
Non-Patent Document 2: Global Industry Analysts, Inc., "Hydrogen peroxide", A Global strategic business report, MCP-2080, https://www.strategyr.com/pressMCP-2080.asp
Non-Patent Document 3: Fukuzumi, S., et al., Electrochim. Acta 82, 493-511 (2012)
Non-Patent Document 4: Jin, Z., et al., Appl. Catal. B 205, 569-575 (2017)
Non-Patent Document 5: Shiraishi, Y., et al., Angew. Chem. Int. Ed. 53, 13454-13459 (2014)
Non-Patent Document 6: Wei, Z., et al., Energy Environ. Sci. 11, 2581-2589 (2018))
Non-Patent Document 7: C. H. Ng, O. Winther-Jensen, et al., J. Mater. Chem. A, 2015, 3, 11358.
Non-Patent Document 8: Oka, K., et al., Energy Environ. Sci. 11, 1335-1342 (2018).
Non-Patent Document 9: Oka, K., et al., Adv. Energy Mater. 9, 1803286, (2019).

SUMMARY OF THE INVENTION

Problems to be Solved by the Invention

The problems to be solved by the present invention are to explore an organic polymer compound that has an energy level and a band gap (i.e., a difference between a highest occupied molecular orbital (HOMO) level and a lowest unoccupied molecular orbital (LUMO) level) of a catalyst suitable for light absorption, a LUMO level suitable for reducing oxygen to produce hydrogen peroxide, and a HOMO level suitable for the oxidative regeneration of a catalyst acting in a reaction that is a compensating reaction pairing with the oxygen reduction reaction and causes the oxidation of water to produce oxygen; to establish simple conditions that allow the organic polymer compound to act in these reactions; and to provide a novel environmentally compatible method for producing hydrogen peroxide at extremely high efficiency.

Means for Solving the Problems

On the basis of the findings about water splitting under light irradiation that are obtained by the present inventors ahead of anyone else in Japan and abroad, and the present inventors' own method for forming a thiophene polymer film, the present inventors conducted intensive studies to develop an all-new method for easily producing hydrogen peroxide from water under light irradiation. As a result, the present inventors found that irradiating a film of a thiophene polymer that is a pure organic compound with light allows the thiophene polymer film to act as a catalyst for light absorption and oxygen reduction that produces hydrogen peroxide from oxygen and water, particularly even water under an atmosphere of air, at extremely high efficiency, and this film can work at high pH at which a film of a general-purpose inexpensive catalyst for water oxidation is active, leading to the completion of the present invention.

Specifically, the present invention provides a method for producing hydrogen peroxide, comprising combining a film of a catalyst for light absorption and oxygen reduction (hereinafter referred to as a light-absorbing oxygen reduction catalyst film) that consists of a thiophene polymer and a catalyst for water oxidation (hereinafter referred to as a water-oxidizing catalyst), immersing the combination in alkaline water, and irradiating the light-absorbing oxygen-reduction catalyst film with light.

In the method for producing hydrogen peroxide of the present invention, the thiophene polymer may be a copolymer of thiophene and an aromatic compound having a structural unit represented by the following formula (I) (hereinafter referred to as a thiophene copolymer):

[Formula 1]

(I)

wherein
A represents a constitutional unit derived from an aromatic compound;
x and 1−x represent a composition ratio of the constitutional units of the copolymer; and
x is 0<x≤1.

In the method for producing hydrogen peroxide of the present invention, an electric conductive plate having the surface coated with the light-absorbing oxygen reduction catalyst film may be connected to an electric conductive plate having the surface coated with the water-oxidizing catalyst film via a conductor, and the connected plates may be immersed in alkaline water and irradiated with light.

In the method for producing hydrogen peroxide of the present invention, the electric conductive plate having the surface coated with the light-absorbing oxygen reduction catalyst film may be a transparent electric conductive plate.

In the method for producing hydrogen peroxide of the present invention, a plurality of the electric conductive plates having the surface coated with the light-absorbing oxygen reduction catalyst film may be connected.

In the method for producing hydrogen peroxide of the present invention, an electric conductive plate that has one side coated with the light-absorbing oxygen reduction catalyst film and the other side coated with the water-oxidizing catalyst film may be immersed in alkaline water and irradiated with light.

In the method for producing hydrogen peroxide of the present invention, microparticles of the water-oxidizing catalyst having the surface mostly coated with a thiophene copolymer may be immersed in alkaline water and irradiated with light.

In the method for producing hydrogen peroxide of the present invention, the thiophene copolymer may be obtained by previously synthesizing a dimer or a trimer of thiophene and an aromatic compound represented by the following general formula (II) or (III) and polymerizing the dimer or trimer to form a copolymer of thiophene and the aromatic compound:

[Formula 2]

(II)

[Formula 3]

(III)

wherein B and C represent an aromatic compound.

In the method for producing hydrogen peroxide of the present invention, the water-oxidizing catalyst may be composed of manganese oxide, cobalt oxide, or ruthenium oxide.

In the method for producing hydrogen peroxide of the present invention, the light irradiation may be performed using natural sunlight, artificial sunlight, or ultraviolet or visible light as a light source.

The present invention also provides a method for preparing a light-absorbing oxygen reduction catalyst film by applying the synthesized dimer or trimer on an electric conductive plate and exposing the plate to iodine vapor to form the thiophene copolymer.

The present invention further provides a plate for producing hydrogen peroxide, wherein the plate is an electric conductive plate that has one side coated with a light-absorbing oxygen reduction catalyst film and the other side coated with a water-oxidizing catalyst film.

The present invention also provides a microparticle for producing hydrogen peroxide, wherein the microparticle is a water-oxidizing catalyst that has catalytic activity for water oxidation and has the surface coated with a light-absorbing oxygen reduction catalyst film.

The present invention also provides a combination structure of electric conductive plates for producing hydrogen peroxide, wherein the combination is formed by combining an electric conductive plate having the surface coated with a light-absorbing oxygen reduction catalyst film and an electric conductive plate having the surface coated with a water-oxidizing catalyst film and connecting them via a conductor.

Advantageous Effect of the Invention

The present invention provides a novel environmentally compatible method for producing hydrogen peroxide at extremely high efficiency.

MODES FOR CARRYING OUT THE INVENTION

1. Method for Producing Hydrogen Peroxide

One embodiment of the present invention is a method for producing hydrogen peroxide.

More specifically, one embodiment of the present invention is a method for producing hydrogen peroxide, comprising steps of combining a film of a catalyst for light absorption and oxygen reduction (hereinafter referred to as a light-absorbing oxygen reduction catalyst film) that consists of a thiophene polymer with a catalyst for water oxidation (hereinafter referred to as a water-oxidizing catalyst), immersing the combination in alkaline water, and irradiating the light-absorbing oxygen reduction catalyst film with light.

As used herein, the term "consist of" is used to mean "formed from" and is not used to mean "consist of only." In other words, the phrase "consist of a thiophene polymer" means "formed from a thiophene polymer" and does not mean "consist of only a thiophene polymer."

As used herein, a light-absorbing oxygen reduction catalyst film means a film consisting of a material having both activity for light absorption and catalytic activity for oxygen reduction and does not comprise a film formed by layering a material having light-absorbing activity on another material having oxygen-reducing activity or vice versa or mixing these materials.

The method of the present invention for producing hydrogen peroxide under light irradiation will be described below in detail with reference to the accompanying drawings.

Figure 1:
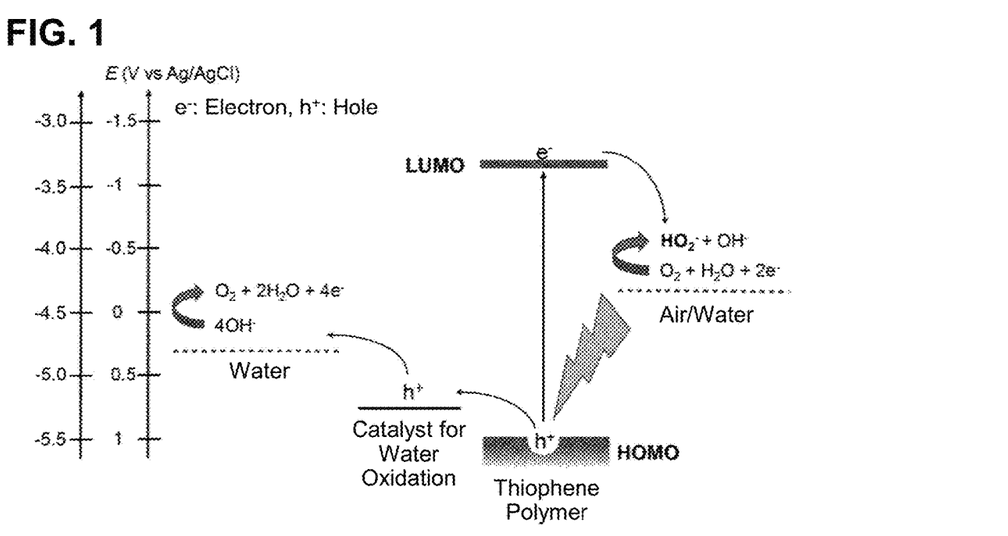
FIG. 1 is an energy level diagram required for the methods of the present invention for producing hydrogen peroxide by combining a thiophene polymer to be used as a catalyst for light absorption and oxygen reduction with a catalyst for water oxidation and irradiating the combination in alkaline water with light.

An energy level required for the methods of the present invention for producing hydrogen peroxide is shown in FIG. 1, in which a thiophene polymer to be used as a light-absorbing oxygen reduction catalyst is combined with a water oxidizing catalyst, and the combination is irradiated with light in alkaline water.

The right side of FIG. 1 will be first described. The potential in the reduction (i.e., gain of two electrons) of a water-dissolved oxygen molecule and then production of hydrogen peroxide according to the reaction formula $O_2+2H_2O+2e^- \rightarrow H_2O_2+2OH^-$ (neutral) is −0.21 V that is a value of the redox potential as measured using a silver/silver chloride electrode as a reference electrode (hereinafter expressed in vs Ag/AgCl). Alternatively, the potential in the production of a hydrogen peroxide anion, which is a precursor of hydrogen peroxide, according to the reaction formula $O_2+2H_2O+2e^- \rightarrow HO_2^-+OH^-$ (alkaline) is −0.15 V vs Ag/AgCl. It should be noted that the hydrogen peroxide anion is neutralized in open air to spontaneously form hydrogen peroxide according to the reaction formula $HO_2^-+H^+ \rightarrow H_2O_2$.

The most important component of the present invention is an organic polymer film shown in the second row from the right side of FIG. 1 and plays a catalytic role such that it absorbs light to cause charge separation and allows the resulting excited electrons to be subjected to oxygen reduction. To play the role, the film, which consists of a π-conjugated organic polymer, must meet the requirements that the conjugated organic polymer has (1) a high light absorption coefficient and (2) a lowest unoccupied molecular orbital (LUMO) level moderately higher than the reduction potential of oxygen. For the requirement (1), the polymer has desirably a band gap of about 2.0 eV. The film must also meet the requirements that it has (3) a charge transport property that allows electrons and holes resulting from charge separation to be diffused to the left and right interfaces and (4) a highest occupied molecular orbital (HOMO) level moderately low to inject holes to a catalyst for water oxidation. The film must further meet the requirement that it has (5) high efficiency of electron injection to oxygen, i.e., a catalytic ability. Additionally, the film desirably meets the requirement that it has (6) a catalytic ability that is independent of pH of water, for example, that is retained even under alkaline conditions in which a water oxidizing catalyst efficiently acts.

The water-oxidizing catalyst shown in the third row from the right side of FIG. 1 plays a catalytic role such that it gains holes from the organic polymer film irradiated with light and allows the holes to be subjected to water oxidation. Representative examples of general-purpose inexpensive water-oxidizing catalysts that have high activity include manganese oxide, and such catalysts act in alkaline water. The potential in the oxidation (i.e., loss of four electrons) of water and then production of oxygen according to the reaction formula $4OH^- \rightarrow O_2+2H_2O+4e^-$ (in alkaline water), as shown in the fourth row, is +0.32 V vs Ag/AgCl. The potential of manganese oxide is +0.5 V vs Ag/AgCl. Therefore, when the conjugated organic polymer has a HOMO level of approximately +1.0 V vs Ag/AgCl, the ideal giving and receiving of electrons (or holes) sequentially occur, resulting in the establishment of a cascade.

Components in the method for producing hydrogen peroxide of the present invention will be specifically described below.

Examples of the thiophene polymer composing the light-absorbing oxygen reduction catalyst film include a copolymer having a structural unit represented by the following general formula (I) (hereinafter referred to as a thiophene copolymer):

[Formula 4]

wherein

A represents a constitutional unit derived from an aromatic compound, x and 1−x represent a composition ratio of the constitutional units of the copolymer, and x is 0<x≤1, preferably ½≤x≤⅔, and more preferably x=⅔.

The thiophene copolymer has preferably a degree of polymerization ranging from 2 to 30, more preferably from 4 to 15 and has preferably an average molecular weight ranging from 500 to 7500, more preferably from 1000 to 4000.

Examples of the aromatic compound that binds to thiophene to form a thiophene polymer include benzene, naphthalene, anthracene, furan, thiophene, fluorothiophene, 3,4-difluorothiophene, 3,4-dimethylthiophene, pyrrole, pyrazole, imidazole, pyridine, pyridazine, pyrimidine, pyrazine, toluene, ethylbenzene, cumene, phenol, benzyl alcohol, anisole, benzaldehyde, benzoic acid, acetophenone, benzenesulfonic acid, nitrobenzene, aniline, thiophenol, benzonitrile, styrene, xylene, cresol, catechol, resorcinol, hydroquinone, phthalic acid, isophthalic acid, terephthalic acid, salicylic acid, and toluidine.

Thiophene and thiophene derivatives that are used to obtain a thiophene polymer are represented by the following general formula (II) or the following general formula (III):

[Formula 5]

(II)

[Formula 6]

(III)

wherein B and C represent an aromatic compound.

Examples of the thiophene derivative include 2-phenylthiophene, terthiophene, 3,4-ethylenedioxythiophene, 1,4-di(2-thienyl)benzene, 1,4-di(2-thienyl)pyrrole, 1,4-di(2-thienyl)pyridine, 1,4-di(2-thienyl)piperidine, 1,4-di(2-thienyl)naphthalene, 1,4-di(2-thienyl)-2-fluorobenzene, and 3-phenyl-terthiophene. Most of the thiophene derivatives have π-conjugated molecules that are more electron-withdrawing than thiophene, and thiophene polymers derived therefrom have a HOMO, a LUMO, and a band gap between the HOMO and LUMO that satisfy the requirements described above. Also, to function as a catalyst film that works upon the contact with water, the thiophene derivatives preferably confers hydrophilicity. In addition, the thiophene derivatives must meet requirements of a solvent solubility, a melting point, and an ability to form a thin film that are suitable for the reactivity in polymerization and conditions of polymerization as described below.

Examples of the method for preparing a thiophene polymer include vapor phase polymerization, electrolytic polymerization, and chemical oxidation polymerization (Synthesis and Reactions of Polymers (2), Synthesis of Condensed Polymers, New Polymer Experimentology 3 (in Japanese), edited by The Society of Polymer Science, Japan, published by KYORITSU SHUPPAN CO., LTD., 1996). The method is representatively vapor phase polymerization which is superior to other polymerization methods in that (1) it does not use metal catalysts and does not leave residues, (2) it is performed in a simple polymerization vessel, (3) it comprises an easy purification step, and (4) it is easy to scale up.

Examples of the plate on which the light-absorbing catalyst film is formed include glassy carbon, carbon paper, a conducting glass (e.g., a transparent glass having the surface coated with indium tin oxide (ITO)), and an electric conductive transparent plastic film (e.g., an electric conductive polyethylene terephthalate film having the surface coated with poly(4-styrenesulfonic acid) (PSS)-doped poly(3,4-ethylenedioxythiophene) (PEDOT)).

Examples of the water-oxidizing catalyst include manganese oxide, iridium, iridium oxide, ruthenium oxide, and nickel/cobalt/iron. The representative example manganese oxide is prepared by electrolytic oxidation in an ionic liquid of manganese acetate (Zhou, F., et al, Advanced Energy Materials 2, 1013-1021, (2012)).

The reaction mixture has a neutral or alkaline pH, preferably an alkaline pH. The reaction mixture is alkaline water, for example, having a pH of 8 or higher, more preferably a pH of 11 or higher, and even more preferably a pH of around 12. Examples of the alkaline water include an aqueous solution of sodium hydroxide, an aqueous solution of potassium hydroxide, and phosphate buffer.

The light source to be used for light irradiation may be any light sources emitting ultraviolet or visible light. The most effective light source is natural sunlight in view of the costs and efficiency, and artificial sunlight may also be used.

Figure 2:
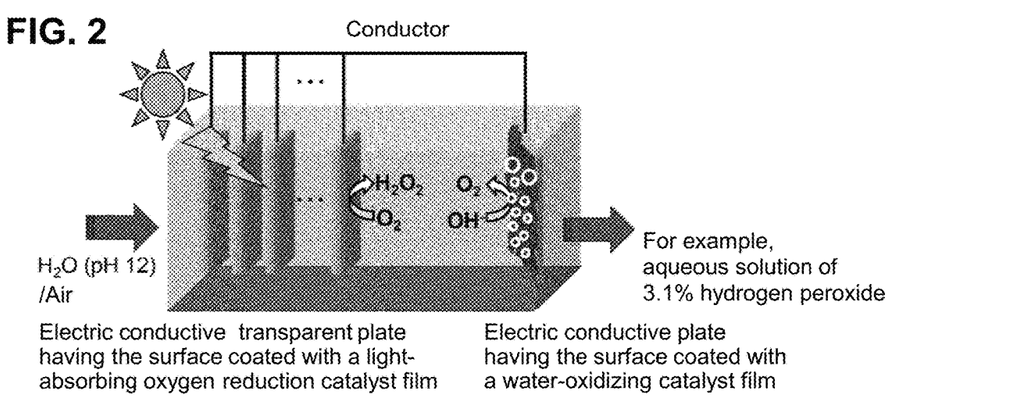
FIG. 2 shows a method for producing hydrogen peroxide by connecting a plate (preferably a transparent plate) having the surface coated with a light-absorbing oxygen reduction catalyst film that consists of a copolymer of thiophene and an aromatic compound and a plate having the surface coated with a water-oxidizing catalyst film via a conductor, immersing the connected plates in alkaline water, and irradiating the plates with light.

Hydrogen peroxide is produced by connecting a plate (preferably transparent plate) having the surface coated with a light-absorbing oxygen reduction catalyst film consisting of a copolymer of thiophene and an aromatic compound and a plate having a water-oxidizing catalyst film via a conductor, immersing the connected plates in alkaline water, and performing light irradiation (see FIG. 2). More than one transparent plate having the surface coated with a light-absorbing oxygen reduction catalyst film is preferably used.

Figure 3:
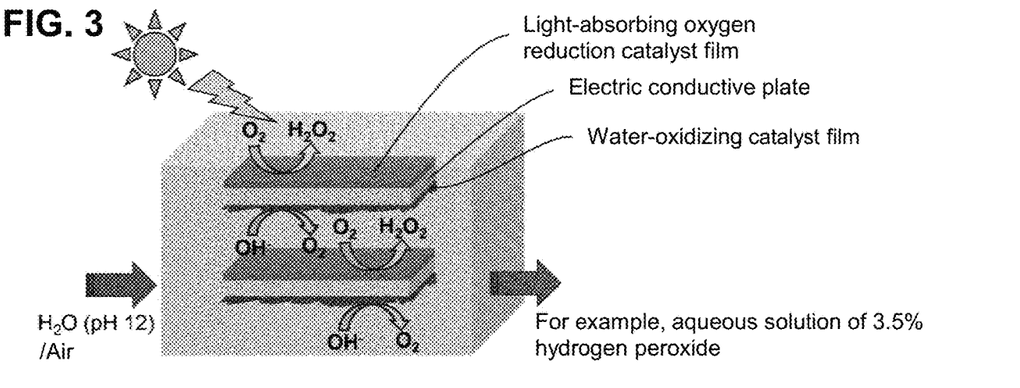
FIG. 3 shows a simple reaction tank in which an electric conductive plate sandwiched between a light-absorbing oxygen reduction catalyst and a water-oxidizing catalyst film is placed in water under light irradiation.

Alternatively, hydrogen peroxide is produced by immersing an electric conductive plate that has one side coated with a light-absorbing oxygen reduction catalyst film consisting of a copolymer of thiophene and an aromatic compound and the other side coated with a water-oxidizing catalyst film in alkaline water and performing light irradiation (see FIG. 3).

The conductor is a commonly used conductor, for example, a copper wire.

In the present invention, hydrogen peroxide can be produced by a method comprising immersing microparticles of a water-oxidizing catalyst having the surface mostly coated with a thiophene copolymer in alkaline water and performing light irradiation.

Example of the microparticles include a manganese oxide microparticle (preferably having a particle size from 0.1 to 1 μm) having the surface partially coated with a thiophene polymer by the chemical oxidation polymerization method.

2. Method for Preparing a Light-Absorbing Oxygen Reduction Catalyst Film

Another embodiment of the present invention is a method for preparing a light-absorbing oxygen reduction catalyst film.

More specifically, another embodiment of the present invention is a method for preparing a light-absorbing oxygen reduction catalyst film to obtain the thiophene copolymer described in the section "1. Method for producing hydrogen peroxide," wherein the method is characterized by previously synthesizing a dimer or a trimer of thiophene and an aromatic compound represented by the general formula (II) or (III), applying the dimer or trimer on an electric conductive plate, and exposing the plate to iodine vapor to obtain the thiophene copolymer.

Even more specifically, another embodiment of the present invention can be performed by the methods described in the section "1. Method for producing hydrogen peroxide" and in the following Examples.

3. Plate for Producing Hydrogen Peroxide

Another embodiment of the present invention is a plate for producing hydrogen peroxide.

More specifically, another embodiment of the present invention is a plate for producing hydrogen peroxide, wherein the plate is an electric conductive plate that has one side coated with a light-absorbing oxygen reduction catalyst film and the other side coated with a water-oxidizing catalyst film.

Types of the electric conductive plate, methods for producing a light-absorbing oxygen reduction catalyst film, methods for producing a water-oxidizing catalyst film, methods for preparing a plate for producing hydrogen peroxide, methods for producing hydrogen peroxide by using these, and the like are described in detail in the section "Method for producing hydrogen peroxide." Examples actually performed are described in the following Examples.

Plates for producing hydrogen peroxide are prepared on the basis of the description in the section "1. Method for producing hydrogen peroxide" and the following Examples and can be used to produce hydrogen peroxide.

4. Microparticles for Producing Hydrogen Peroxide

Another embodiment of the present invention is a microparticle for producing hydrogen peroxide.

More specifically, another embodiment of the present invention is a microparticle for producing hydrogen peroxide, wherein the microparticle is a water-oxidizing catalyst that has catalytic activity for water oxidation and has the surface coated with a light-absorbing oxygen reduction catalyst film.

Types and sizes of microparticles of a water-oxidizing catalyst having catalytic activity for water oxidation, methods for producing a light-absorbing oxygen reduction catalyst film, methods for forming a light-absorbing oxygen reduction catalyst film on the surface of a water-oxidizing catalyst, and methods for producing hydrogen peroxide by using the microparticles, which are used in the embodiment, and the like are described in the section "1. Method for producing hydrogen peroxide." Examples specifically performed are described in the following Examples.

Microparticles for producing hydrogen peroxide are prepared on the basis of the description in the section "1. Method for producing hydrogen peroxide" and the following Examples and can be used to produce hydrogen peroxide.

5. A Combination Structure of Electric Conductive Plates for Producing Hydrogen Peroxide Another embodiment of the present invention is a combination structure of electric conductive plates for producing hydrogen peroxide.

More specifically, another embodiment of the present invention is a combination structure of electric conductive plates for producing hydrogen peroxide, wherein the combination is an electric conductive plate having the surface coated with a light-absorbing oxygen reduction catalyst film that is connected to an electric conductive plate having the surface coated with a water-oxidizing catalyst film via a conductor.

A method for producing hydrogen peroxide comprising connecting an electric conductive plate having the surface coated with a light-absorbing oxygen reduction catalyst film to an electric conductive plate having the surface coated with a water-oxidizing catalyst film via a conductor is described in the section "1. Method for producing hydrogen peroxide." Specific examples actually performed are described in the following Examples.

A combination structure of electric conductive plates for producing hydrogen peroxide is prepared on the basis of the description in the section "1. Method for producing hydrogen peroxide" and the following Examples and can be used to produce hydrogen peroxide.

All references cited herein are incorporated herein by reference in their entirety. The Examples described below exemplify embodiments of the present invention and should not be construed to limit the scope of the present invention.

EXAMPLES

Example 1

<Production of Hydrogen Peroxide by Using Poly(1,4-Di (2-Thienyl)Benzene) as a Thiophene Polymer and Glassy Carbon as an Electric Conductive Plate>

Hydrogen peroxide was produced by connecting a glassy carbon plate having the surface coated with a light-absorbing oxygen reduction catalyst film prepared by polymerizing 1,4-di(2-thienyl)benzene, which is a trimer consisting of two thiophenes linked at positions 1 and 4 of benzene (C in the following formula (III) is a 1,4-benzene group), under iodine vapor (described below in detail) and another glassy carbon plate having the surface coated with a water-oxidizing catalyst film via a conductor, immersing the connected plates in alkaline water, and performing light irradiation.

[Formula 7]

(III)

This method will be described below in detail.

(1) Synthesis of 1,4-Di(2-Thienyl)Benzene

According to the following reaction formula, 1,4-di(2-thienyl)benzene was synthesized.

[Formula 8]

1,4-Dibromobenzene (1.18 g, Tokyo Chemical Industry Co., Ltd., Product code: D0170), 2-thiopheneboronic acid pinacol ester (2.36 g, Tokyo Chemical Industry Co., Ltd., Product code: T2924), potassium carbonate (1.55 g, Tokyo Chemical Industry Co., Ltd., Product code: P1748), and [1,1'-bis(diphenylphosphino)ferrocene]dichloropalladium (II) (0.204 g, Tokyo Chemical Industry Co., Ltd., Product code: B2064) were dissolved in a mixed solvent of tetrahydrofuran (25 mL) and water (3.5 mL) and refluxed under an atmosphere of nitrogen gas at 60° C. for 24 hours. The mixture was phase-separated with ethyl acetate/water, and the ethyl acetate phase was removed and passed through a silica gel-loaded column (eluted with toluene as an elution solvent) to fractionate 1,4-di(2-thienyl)benzene. The fraction was recrystallized with toluene to obtain 1,4-di(2- thienyl)benzene (0.957 g) as a yellow crystal. The resulting crystal was soluble in chloroform, dichloromethane, THF, toluene, and other solvent. Melting point: 206° C., $^1$H-NMR (CD$_2$Cl$_2$, 500 MHz, ppm): δ=7.64 (s, 4H), 7.37 (d, J=4.0 Hz, 2H), 7.32 (d, J=5.2 Hz, 2H), 7.11 (dd, J=4.4, 3.2 Hz, 2H), MS m/z=242.2, (calculated) m/z=242.4

(2) Polymerization of 1,4-Di(2-Thienyl)Benzene on a Glassy Carbon Plate Under Iodine Vapor 1,4-Di(2-thienyl)benzene (100 mg) was dissolved in chlorobenzene (10 mL), and a 10 cm square piece of a glassy carbon plate (ALLIANCE Biosystems Inc.) was spin-coated with the solution (4 mL) (at 1500 revolutions per minute for 3 seconds, 20 seconds, and then 3 seconds). The piece was placed in a bell jar together with iodine (0.5 g) on another dish, and the bell jar was sealed and heated at 70° C. for 2 hours. The 1,4-di(2-thienyl)benzene-applied surface of the piece was washed with acetonitrile (200 mL) three times.

[Formula 9]

The formed film strongly absorbed light having a wavelength range between 300 nm and 600 nm in ultraviolet-visible infrared absorption. The formed film did not absorbed light in the near-infrared band, indicating that it was an undoped pure thiophene polymer. In MALDI-TOF mass spectrometry, the formed film was demonstrated to be a polymer having a maximum molecular weight of about 3,400 and to have a main component having a molecular weight of 962 and a degree of polymerization of 4. In Raman spectroscopy (excitation wavelength: 532 and 785 nm), it was supported that the formed film had a strong absorption peak at 1222 cm$^{-1}$ and was a linear polymer. In the measurement (at a grazing incidence angle of 4° in the parallel method) with a general-purpose multifunctional X-ray diffractometer (RINT-Ultima III, Rigaku Corporation), the formed film was demonstrated to exhibit a broad spectrum and to be an amorphous polymer.

The highest occupied molecular orbital level of the thin film was calculated to be −5.5 eV from the cyclic voltammogram (at a sweep rate of 50 mV/s) obtained by using a solution of 0.1 M tetrabutylammonium perchlorate in acetonitrile as an electrolyte. Further, the lowest unoccupied molecular orbital level was calculated to be −3.3 eV from the band gap calculated from the ultraviolet absorption spectrum.

(3) Formation of a Thin Film of Manganese Oxide on a Glassy Carbon Plate

The thin film of manganese oxide was formed according to a procedure described in a known literature (Zhou, F., et al., Advanced Energy Materials 2, 1013-1021, doi:10.1002/aenm.201100783 (2012)). Briefly, ethylamine (200 mL) was neutralized with 4 M dilute nitric acid, and then water was removed under reduced pressure in a rotatory evaporator at 70° C. for 2 hours to prepare ethylammonium nitrate. Manganese acetate (0.2 g) was dissolved in a 1:9 mixture (100 mL) of water and ethylammonium nitrate to prepare an electrolyte. Dilute nitric acid (0.25 mL, 4 M) was added to make the electrolyte acidic. A 10 cm square piece of a glassy carbon plate was immersed in the electrolyte, and platinum was used as a counter electrode. A current was applied to them at a constant current density of 200 μA/cm$^2$ at 120° C. for 5 minutes. The thin film of manganese oxide deposited on the glassy carbon plate was washed thoroughly with distilled water.

(4) Production of Hydrogen Peroxide Under Light Irradiation

The 10 cm square piece of the glassy carbon plate coated with the thin film of the thiophene polymer obtained by polymerizing 1,4-di(2-thienyl)benzene under iodine vapor was connected to the 10 cm square piece of the glassy carbon plate coated with the thin film of manganese oxide via a copper wire. The connected glassy carbon plates were placed in a tank 12 cm wide, 10 cm deep, and 0.3 cm long (each inside dimension) such that the glassy carbon plate coated with the thin film of the thiophene polymer was irradiated. The tank was filled with 30 mL of an aqueous solution of sodium hydroxide at pH 12 and irradiated with light (artificial sunlight, at an irradiance of 1000 W/m$^2$, Asahi Spectra Co., Ltd.).

An amount of hydrogen peroxide was measured according to a conventional method (Naga, A. et al., Anal. Chim. Acta, 204, 349-353 (1988)). Briefly, hydrogen peroxide was quantified by reducing a copper(II) ion with hydrogen peroxide in the presence of an excess of 2,9-dimethyl-1,10-phenanthroline to form a copper(I) complex. Neocuproine (1 g) was dissolved in ethanol (100 cm$^3$) to prepare a solution of 2,9-dimethyl-1,10-phenanthroline in ethanol. An aqueous solution of 0.01 M copper(II) sulfate (1 cm$^3$) was combined with the solution of 2,9-dimethyl-1,10-phenanthroline (1 cm$^3$) in ethanol in a 10 cm$^3$ volumetric flask. A sample solution of hydrogen peroxide (8 cm$^3$) was added. The resulting copper(I)-DMP complex was determined on the basis of the absorption intensity at a maximum absorption wavelength of 454 nm. A calibration curve based on 5 points from 0 to 120 μM was plotted using a commercially available solution of 35 wt % hydrogen peroxide (Tokyo Chemical Industry Co., Ltd., Product code: H1222) as a standard solution. The aqueous solution containing hydrogen peroxide was adjusted to pH 9 with an aqueous solution of dilute sulfuric acid diluted with distilled water.

Ten hours after the start of light irradiation, about 30 mL of a hydrogen peroxide solution was obtained at a concentration of 0.9 wt %. Moreover, 24 hours after the start of light irradiation, about 30 mL of a hydrogen peroxide solution was obtained at a concentration of 2.0 wt %. The production rate of hydrogen peroxide 10 hours after light irradiation was 1.1 mg hydrogen peroxide/mg catalyst/hour which is higher than the known value obtained from a similar method by 2 or more orders of magnitude.

Example 2

<Production of Hydrogen Peroxide by Using an Electric Conductive Plate Coated with PEDOT/PSS>

A glass plate having the surface coated with electric conductive poly(4-styrenesulfonic acid) (PSS)-doped poly (3,4-ethylenedioxythiophene) (PEDOT) (hereinafter abbreviated as PEDOT/PSS) was prepared as follows. An aqueous dispersion of PEDOT/PSS (Aldrich-Sigma Inc., Product code: 483095) was spin-coated on a glass plate (at 1000 rpm for 60 seconds), and the plate was dried by heating at 120° C. for 15 minutes to coat it with PEDOT/PSS. The PEDOT/PSS-coated plate was fixed with an acid-resistant tape and immersed in sulfuric acid (JUNSEI CHEMICAL CO., LTD., Product code: 83010-2550) at ordinary temperature for 1 minute. The plate was washed with ultrapure water twice and then dried by heating at 90° C. for 10 minutes to perform acid treatment. The plate was measured for surface resistance and had a sheet resistance of 89 Ω/sq, a film thickness of 110 nm, and an electric conductivity of 1048 S/cm.

A thiophene polymer film was formed on the glass plate having the surface coated with PEDOT/PSS according to Example 1(2). Two of the plates were connected together and further connected to a glassy carbon plate coated with a thin film of manganese oxide via a copper wire (see FIG. 2).

Hydrogen peroxide was allowed to be produced in a similar manner to Example 1, and 5 hours after the start of light irradiation, about 30 mL of a hydrogen peroxide solution was obtained at a concentration of 0.7 wt %. Eighteen hours after the start of light irradiation, about 30 mL of a hydrogen peroxide solution was obtained at a concentration of 1.9 wt %.

Example 3

<Production of Hydrogen Peroxide by Using Poly(1,4-Di(2-Thienyl)Naphthalene) as a Thiophene Polymer>

A thin film of manganese oxide was formed on one side of a glassy carbon plate as a water-oxidizing catalyst film by the electrolytic oxidation method. 1,4-Di(2-thienyl)naphthalene which is a trimer of thiophene and 1,4-naphthalene was polymerized under iodine vapor to form poly(1,4-di(2-thienyl)naphthalene) on the opposite side of the plate as a light-absorbing oxygen reduction catalyst film. The resulting plate was immersed in alkaline water and irradiated with light to produce hydrogen peroxide. The polymerization under iodine vapor was performed according to Example 1. The polymer film consisting of the trimer had a HOMO level and a LUMO level that are each 0.1 eV lower than those of a polymer of 1,4-di(2-thienyl)benzene.

Hydrogen peroxide was allowed to be produced in a similar manner to Example 1, and 18 hours after the start of light irradiation, about 30 mL of a hydrogen peroxide solution was obtained at a concentration of 3.1 wt %.

Example 4

<Production of Hydrogen Peroxide by Using Poly(2-Fluoro-1,4-Di(2-Thienyl)Benzene) as a Thiophene Polymer>

A thin film of manganese oxide was formed on one side of a glassy carbon plate as a water-oxidizing catalyst film by the electrolytic oxidation method in a similar manner to Example 3. 2-Fluoro-1,4-di(2-thienyl)benzene which is a trimer of thiophene and fluorobenzene was polymerized under iodine vapor to form poly(2-fluoro-1,4-di(2-thienyl)benzene) on the opposite side of the plate as a light-absorbing oxygen reduction catalyst film.

Hydrogen peroxide was allowed to be produced in a similar manner to Example 3, and 24 hours after the start of light irradiation, about 30 mL of a hydrogen peroxide solution was obtained at a concentration of 1.6 wt %.

Example 5

<Production of Hydrogen Peroxide by Using Polyterthiophene as a Thiophene Polymer>

A thin film of manganese oxide was formed on one side of a glassy carbon plate as a water-oxidizing catalyst film by the electrolytic oxidation method in a similar manner to Example 3. Terthiophene which is a trimer of thiophene was polymerized under iodine vapor to form polyterthiophene on the opposite side of the plate as a light-absorbing oxygen reduction catalyst film.

Hydrogen peroxide was allowed to be produced in a similar manner to Example 3, and 24 hours after the start of light irradiation, about 30 mL of a hydrogen peroxide solution was obtained at a concentration of 1.2 wt %.

Example 6

<Production of Hydrogen Peroxide by Modifying a Method for Forming Poly(1,4-Di(2-Thienyl)Benzene)>

In Example 1, poly(1,4-di(2-thienyl)benzene) was obtained by electrolytic polymerization. Specifically, 100 mg of 1,4-di(2-thienyl)benzene was dissolved in 10 mL of a solution of 0.1 M tetrabutylammonium perchlorate in acetonitrile. A glassy carbon plate was immersed in the resulting solution and subjected to cyclic voltammetry (at a sweep rate of 50 mV/s) between 0 and 1.2 V vs Ag/Ag ion in one sweep cycle to form a thin film of poly(1,4-di(2-thienyl)benzene). The plate was exposed to ethanol or acetonitrile to allow the removal of residues.

The plate was immersed in a tank filled with 30 mL of an aqueous solution of sodium hydroxide at pH 12 and then irradiated with light (artificial sunlight, at an irradiance of 1000 W/m$^2$, Asahi Spectra Co., Ltd.) in a similar manner to Example 1, and 24 hours after the start of light irradiation, about 30 mL of a hydrogen peroxide solution was obtained at a concentration of 2.1 wt %.

Example 7

<Method for Producing Hydrogen Peroxide by Using Microparticles as a Water-Oxidizing Catalyst Film>

Manganese oxide microparticles (particle size: 50 µm) having the surface partially coated with a thiophene polymer by the chemical oxidation polymerization method were dispersed in alkaline water and irradiated with light to produce hydrogen peroxide. This method will be described below in detail.

(1) Formation of a Poly(1,4-Di(2-Thienyl)Benzene) Film on the Surface of Manganese Oxide Microparticles Manganese oxide (II, III) (200 mg, Aldrich-Sigma Inc., Product code: 377473-100G) was dispersed in chlorobenzene (50 ml) and 1,4-di(2-thienyl)benzene (500 mg) in a flask, and the mixture was then transferred into a 200 ml flask and sonicated in an ultrasonic bath for 20 minutes to achieve sufficient dispersion. An oxidizing agent, anhydrous ferric chloride (7.8 g) was dissolved in chlorobenzene (50 ml) and added dropwise to the mixture at room temperature. The mixture was stirred at room temperature for 24 hours. The dark gray precipitates were recovered by filtration and extracted with methanol for 24 hours to remove residual ferric chloride. The precipitates were washed with methanol several times and dried by heating in a vacuum oven to obtain manganese oxide having the surface coated with a poly(1,4-di(2-thienyl)benzene) film.

(2) Production of Hydrogen Peroxide Under Light Irradiation

The microparticles (50 mg) prepared in (1) were added into a 500 mL beaker, and an aqueous solution (100 mL) of sodium hydroxide at pH 12 was further added. The content was irradiated with light (artificial sunlight, at an irradiance of 1000 W/m$^2$, Asahi Spectra Co., Ltd.) with stirring.

Nine hours after the start of light irradiation, about 100 mL of a hydrogen peroxide solution was obtained at a concentration of 1.8 wt %.

The results described above demonstrate that the methods for producing hydrogen peroxide of the present invention have the features as listed below.

(1) The methods of the present invention work under light irradiation. This is supported by the finding that the methods of the present invention work when a thiophene polymer, including a copolymer of thiophene and an aromatic compound, is used, in which the thiophene polymer satisfies both an energy level that allows the polymer to act as a light-absorbing oxygen reduction catalyst film and an energy level that allows the polymer to exhibit compensating activity of a water-oxidizing catalyst against the water-oxidizing catalyst film.

(2) The methods of the present invention have a sufficiently high production rate of hydrogen peroxide (>0.1 mg hydrogen peroxide/mg catalyst/hour which is higher than the known value obtained from a similar method by 2 or more orders of magnitude). This is because a thiophene polymer, particularly a copolymer of thiophene and an aromatic compound has a LUMO level sufficiently high to reduce oxygen to produce hydrogen peroxide and has a strong driving force, and sites of the thiophene polymer can act as a catalytically active site. As a result, the methods of the present invention work well with water under an atmosphere of air without using water having an increased concentration of oxygen by bubbling oxygen or other methods.

(3) The methods of the present invention work in a neutral or alkaline water (preferably alkaline water), for example having a pH of 8 or higher, more preferably a pH of 11 or higher. Although this pH condition is optimal for general-purpose inexpensive water-oxidizing catalysts, such as manganese oxide, cobalt oxide, and ruthenium oxide, comprised in the water-oxidizing catalyst film where the compensating reaction in the present invention occurs, this pH condition is typically inappropriate to known light-absorbing oxygen reduction catalysts. Thiophene polymers that have been found in the present invention are the first light-absorbing oxygen reduction catalyst that can act in such pH conditions.

(4) The methods of the present invention work under light irradiation in a simple reaction tank in which an electric conductive plate having a light-absorbing oxygen reduction catalyst connected to another electric conductive plate having a water-oxidizing catalyst film via a conductor (FIG. 2), an electric conductive plate sandwiched between a light-absorbing oxygen reduction catalyst and a water-oxidizing catalyst film (FIG. 3), or microparticles having the surface coated with the other are immersed or suspended in water.

The invention claimed is:

1. A method for producing hydrogen peroxide, comprising connecting an electric conductive plate having a surface coated with a light-absorbing oxygen reduction catalyst film that consists of a thiophene polymer and an electric conductive plate having a surface coated with a film of a water-oxidizing catalyst via a conductor, immersing the connected plates in alkaline water, and performing light irradiation.

2. The production method according to claim 1, wherein the thiophene polymer is a copolymer of thiophene and an aromatic compound (hereinafter referred to as a thiophene copolymer) having a structural unit represented by the following formula (I):

[Formula 1]

wherein
A represents a constitutional unit of an aromatic compound;
x and 1−x represent a composition ratio of the constitutional units of the copolymer; and
x is 0<x≤1.

3. The production method according to claim 1, comprising immersing an electric conductive plate that has one side coated with the light-absorbing oxygen reduction catalyst film and the other side coated with the water-oxidizing catalyst film in alkaline water and performing light irradiation.

4. The production method according to claim 1, comprising immersing microparticles of the water-oxidizing catalyst having the surface mostly coated with a thiophene copolymer in alkaline water and performing light irradiation.

5. The production method according to claim 2, wherein the thiophene copolymer is obtained by previously synthesizing a dimer or a trimer of thiophene and an aromatic compound represented by the following general formula (II) or (III) and polymerizing the dimer or trimer to form a copolymer of thiophene and the aromatic compound:

[Formula 2]

[Formula 3]

wherein B and C represent an aromatic compound.

6. The production method according to claim 1, wherein the water-oxidizing catalyst comprises manganese oxide, cobalt oxide, or ruthenium oxide.

7. The production method according to claim 1, wherein the light irradiation is performed using natural sunlight, artificial sunlight, or ultraviolet or visible light as a light source.

8. The production method according to claim 5, comprising applying the synthesized dimer or trimer on an electric conductive plate and exposing the plate to iodine vapor to obtain a thiophene copolymer.

9. The production method according to claim 2, comprising connecting an electric conductive plate having a surface coated with the light-absorbing oxygen reduction catalyst film and an electric conductive plate having a surface coated with a film of the water-oxidizing catalyst (hereinafter referred to as a water-oxidizing catalyst film) via a conductor, immersing the connected plates in alkaline water, and performing light irradiation.

10. The production method according to claim 2, comprising immersing an electric conductive plate that has one side coated with the light-absorbing oxygen reduction catalyst film and the other side coated with the water-oxidizing catalyst film in alkaline water and performing light irradiation.

11. The production method according to claim 2, comprising immersing microparticles of the water-oxidizing catalyst having the surface mostly coated with a thiophene copolymer in alkaline water and performing light irradiation.

* * * * *